United States Patent [19]
Lindell et al.

[11] 3,771,241
[45] Nov. 13, 1973

[54] STEERING MECHANISM FOR TRENCHER

[75] Inventors: John F. Lindell; Charles B. Hanson, both of Newton, Iowa

[73] Assignee: Koehring Company, Milwaukee, Wis.

[22] Filed: May 5, 1972

[21] Appl. No.: 250,756

[52] U.S. Cl. ............... 37/86, 37/117.5, 180/79.2 B
[51] Int. Cl. ............................. E02f 5/06, B62d 5/10
[58] Field of Search ........................... 37/86, 117.5; 172/438; 180/79.2 B

[56] References Cited
UNITED STATES PATENTS

| | | | |
|---|---|---|---|
| 3,605,903 | 9/1971 | Glesmann | 37/86 X |
| 3,151,694 | 10/1964 | Rogers | 180/79.2 B X |
| 3,605,908 | 9/1971 | McDonald et al. | 172/438 |
| 3,612,310 | 10/1971 | Schaeff | 37/117.5 X |
| 2,827,715 | 3/1958 | Wagner | 37/117.5 |
| 3,380,547 | 4/1968 | Granryd | 180/79.2 B |

FOREIGN PATENTS OR APPLICATIONS

| | | | |
|---|---|---|---|
| 650,730 | 10/1962 | Canada | 180/79.2 B |

Primary Examiner—Robert E. Pulfrey
Assistant Examiner—Clifford D. Crowder
Attorney—Andrew J. Beck

[57] ABSTRACT

A trencher including a self-propelled, articulated frame vehicle having a front frame portion and a rear frame portion pivoted thereto, and a rearwardly extending trenching means for digging a trench as the vehicle moves over the ground. The front frame portion has a power plant and also a pair of laterally spaced, steering wheels. A combined steering effect is provided by having power means for swinging the front frame portion relative to the rear frame portion and also having an Ackerman type steering wherein the steerable front wheels are connected to the rear frame portion.

3 Claims, 6 Drawing Figures

STEERING MECHANISM FOR TRENCHER

BACKGROUND OF THE INVENTION

The present invention pertains generally to earth working equipment and more particularly to self-propelled trenchers for digging a trench for the installation of cable or the like. This type of trencher utilizes a rearwardly extending trenching means including an endless digging chain mounted on a rearwardly extending boom, the chain being power driven by the power source on the vehicle. Such prior art trenchers utilize an articulated frame vehicle whereby by the vehicle has a front frame portion and a rear frame portion which are pivoted together about a generally vertical axis. Power means are provided between the frame portions to effect steering.

Articulated frame vehicles of the type to which the invention generally pertains are advantageous in that, among other things, they provide good maneuverability and are usually able to free themselves when they become stuck. There are disadvantages of articulated frame machines however, in that they sometimes are unstable when turning at a sharp radius and furthermore the operators of some articulated type machines are positioned relative to the pivot point so that they are cantilevered and are exposed to the scissor action of the joint between the frames when the vehicle is turning. Articulated vehicles of the type having a universal pin connection between the front and rear frame portions of the vehicle are also unstable when travelling straight ahead and along the side of a hill, because that end of the vehicle having the highest center of gravity will tip first, thereby pulling the other end with it.

Conventional straight or rigid frame vehicles employing Ackerman type steering have the advantage of good stability, no hazard to the operator due to the scissor action between the frame, they can more easily accommodate cab or roll-over bars, and are generally more comfortable to the operator. Conventional Ackerman steering, rigid frame vehicles have the disadvantage of poor maneuverability and loss of steering ability when back-filling occurs, due to the lifting forces on the front mounted blade. Furthermore, in adverse conditions, such as muddy or wet conditions, these vehicles are difficult to maneuver if a wheel inadvertently goes into the trench, and the vehicle cannot "walk" by articulated action back and forth in an attempt to free itself.

It has been suggested to combine Ackerman and articulated steering but in any such combination, if the articulation axis is positioned at the approximate longitudinal midpoint between the vehicle wheels, the front and rear wheels will not track. A sharp turn of a vehicle including non-tracking wheels induces a condition wherein one set of wheels rotate at a speed different fron the other set of wheels. If all such wheels are drive wheels, such a condition creates a necessity for an interaxle drive differential if "wind-up" stress or faster wheel slippage and loss of steering control is to be circumvented and if the shortest possible turning radius is to be achieved.

SUMMARY OF THE INVENTION

The present invention provides an articulated frame self-propelled trencher which minimizes the above noted shortcomings and utilizes the advantages of both the Ackerman type and articulated frame type steering.

The present invention provides a self-propelled trencher having an articulated frame vehicle, and which vehicle has a front frame portion and a rear frame portion which are pivotally connected together about a generally vertical axis. The front frame portion includes a pair of laterally spaced steering wheels, the rear frame portion has a pair of laterally spaced steering wheels, and all of the wheels may be driven, if desired. The front steering wheels have a tie rod connection therebetween, and a drag link connection is then provided between a steering arm of one of the wheels and the rear frame portion of the vehicle; furthermore, power means, such as a double acting hydraulic cylinder and piston, for example, are provided between the front and rear portions to cause articulation or steering between the frame portions. In this manner two forms of steering are provided, —when the articulated frame steering occurs, the tie rod and drag link connection between the front wheels and the rear frame portion is also actuated, to thereby give a combined articulated frame and Ackerman type steering effect.

With the trencher provided by the present invention, a sharper turning radius is possible than with other types of steering and this sharper turning radius is accomplished with good stability of the vehicle. Furthermore, maximum maneuverability is provided for backfilling and other operations and maneuvering in close quarters.

The vehicle provided by the present invention minimizes tire scuffing and wheel spinning when in a sharp turn, when operating under adverse traction conditions, or when operating under conditions requiring minimal surface disturbance, such as for example, on a lawn.

Another aspect of the invention relates to a trencher of the above type which has a front mounted backfill blade, and wherein the rear wheels can be steered relative to the backfill blade. For example, the blade is often arranged at an angle and occasionally the blade is on the ground and the front wheels are lifted off the ground. Under these circumstances, steering ability is maintained with the present invention, even though the front wheels are out of contact with the ground.

The present invention provides a trencher having a combined steering effect of the above type and in which the generally vertical pivot between the front and rear frame portions is located about one-third of the wheel base length forwardly of the center of the rear wheels. By having the pivot point of frame sections rearwardly of the centerline of the wheel base length, and the position of the connection of the rear end of the drag link to the rear frame as will appear, several advantages are provided; (1) improved tracking ability which permits the rear wheels to track accurately with the front wheels, and this is important when the trencher is used with a four-wheel drive vehicle because tire scuffing is reduced; (2) it is possible to use a transmission without an inter-axle differential thereby resulting in better traction; (3) the rearward location of the vertical pivot axis permits more room in the front frame section and the transmission can be mounted more nearly admidships; (4) the transmission and its driving means and other components can be mounted on the same end of the vehicle as are the engine and hydraulic pump, thereby eliminating hydraulic or other conduits around the pivot point of the vehicle; (5) the operator is located over the pivot point for less lateral swinging movement when the vehicle is turning, as would otherwise occur if he were cantilevered in respect to a centrally located pivot point; and (6) the power plant on the front frame portion may be moved further to the rear, thereby reducing engine over-hang and consequently permitting the forwardly mounted back-fill blade to be mounted closer to the front wheels, thereby minimizing turning moment due to side thrust on the front mounted blade.

Generally, with the improved articulated frame, self-propelled trencher, the combination of articulated frame steering and Ackerman type steering provides exceptionally good maneuverability and a tight turning radius without sacrificing vehicle stability, a longer wheel base is possible while retaining this improved maneuverability, better roadability is provided, and fore and aft shifting movement is reduced.

These and other objects and advantages of the present invention will appear hereinafter as this disclosure progresses, reference being made to the accompanying drawings.

DESCRIPTION OF A PREFERRED EMBODIMENT

Figure 1:
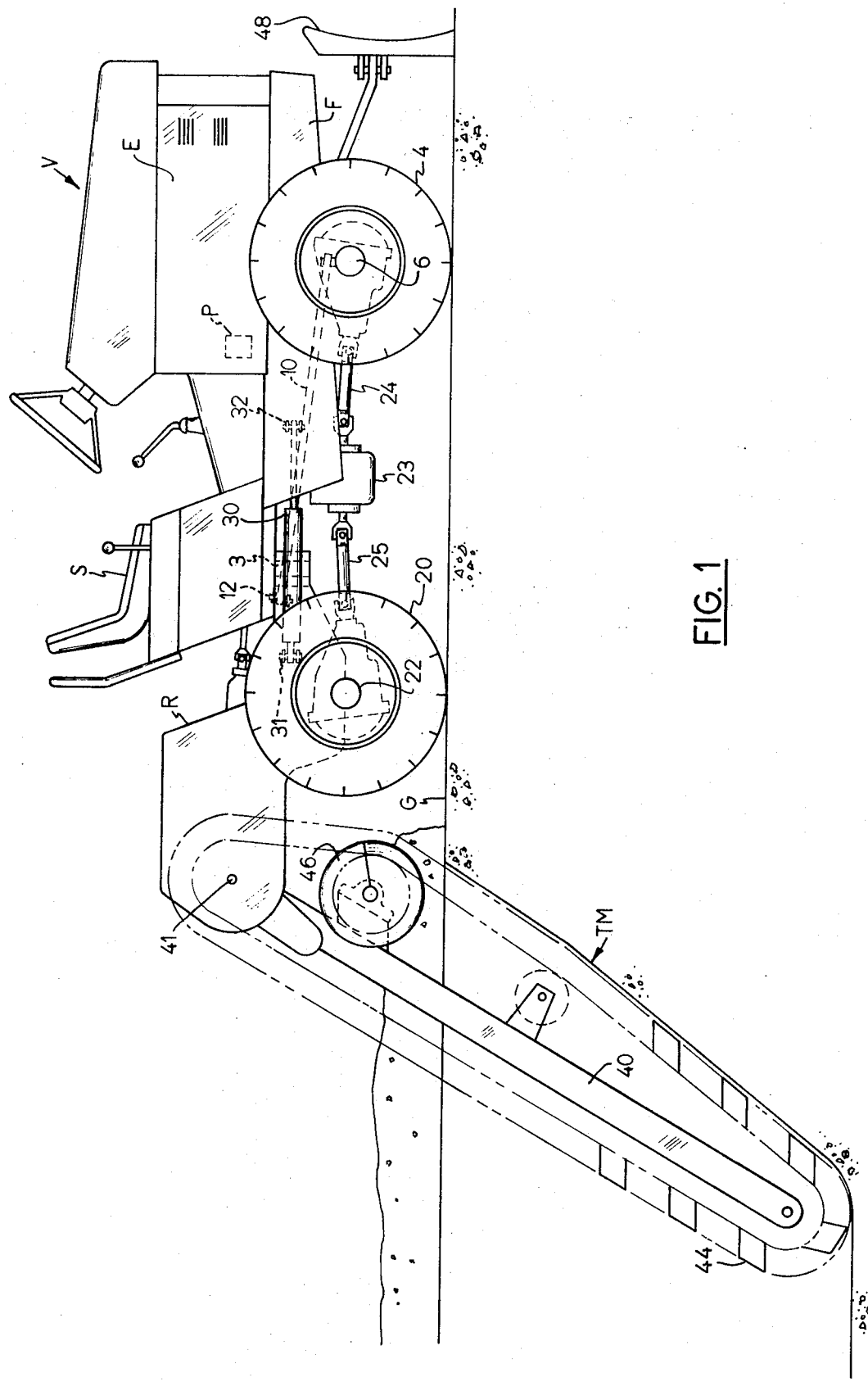
FIG. 1 is a side elevational view of a self-propelled trencher embodying the present invention.
Figure 2:
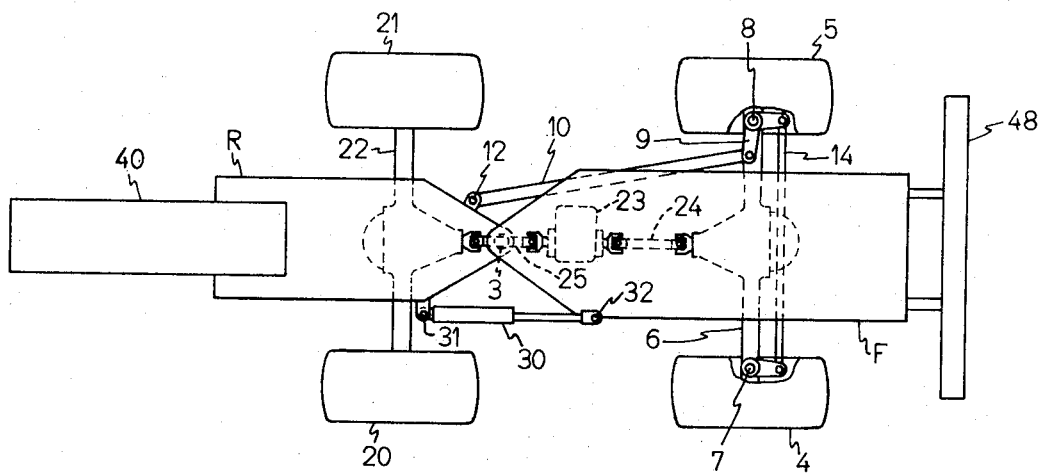
FIG. 2 is a generally schematic plan view of the trencher shown in FIG. 1, on a reduced scale.

The general organization of the self-propelled trencher, as illustrated in FIG. 1, includes an articulated frame vehicle V having a trencher means TM extending rearwardly therefrom. The vehicle is of the four wheel type which provides good stability, and may be of the two-wheel drive type, although the present invention enables the use of a four wheel drive vehicle, as shown.

More specifically, the vehicle itself includes a front frame portion F and a rear frame portion R, which portions are pivotally attached at their adjacent ends and about a generally vertical, pivot axis 3. The front frame portion has a pair of laterally spaced steerable wheels 4 and 5 which are mounted to opposite ends of the front drive axle 6 by conventional steering knuckles and king pins 7 and 8, respectively, One of the king pins has a steering arm 9 fixed thereto and a connecting drag link 10 is pivotally connected to arm 9 and to the rear frame portion, as at 12. It will be noted that the point 12 is located more closely to the vertical pivot 3 than it is to the rear axle, as viewed in plan. The distance between pivot axis 3 and point 12 may vary depending on the steering arm length and other dimensions such as the exact location of axis 3. The steerable wheels 4 and 5 are also connected together by the conventional tie rod 14.

A power plant, such as an internal combustion engine E, is also mounted on the front frame portion and an operator's seat S is located directly over the vertical pivot 3. A hydraulic pump P is located on the front frame portion and is driven by the engine in the known manner to provide pressurized fluid to the hydraulic circuit of the vehicle for operating various components thereof.

The rear frame portion of the vehicle has a pair of laterally spaced wheels 20 and 21 on a rear drive axle 22. Both pairs of front and rear wheels are driven from the centrally located transmission 23, which receives power from the engine E, and through the universal jointed drive shafts 24 and 25.

Figure 3:
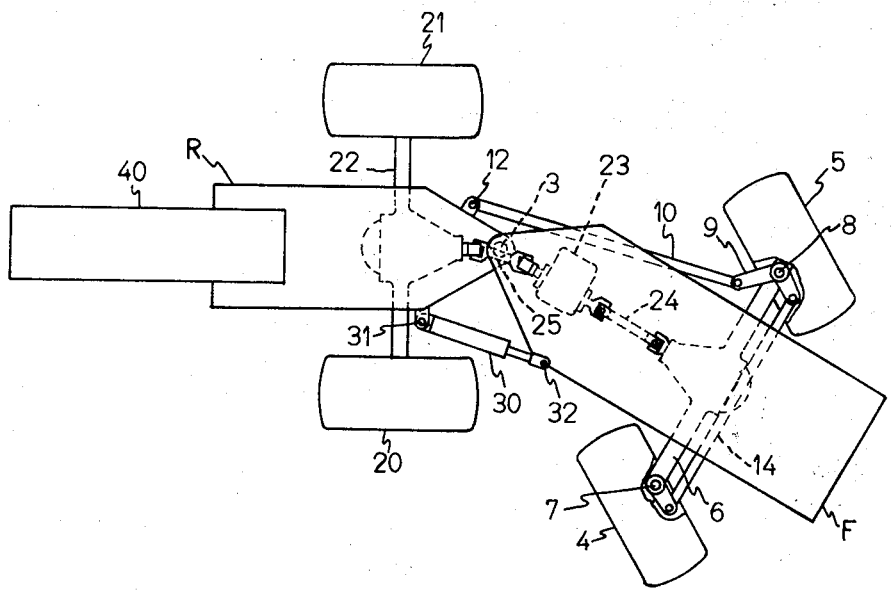
FIG. 3 is a view similar to FIG. 2, but showing the trencher when making a turn.

A double acting hydraulic cylinder unit 30 is pivotally connected at one end to the rear frame as at 31 and is pivotally connected at its other end to the front frame as at 32. This cylinder unit 30 is actuated by pressurized fluid from pump P in the known manner and under the control of the operator. Thus, articulated frame steering is provided by actuation of the hydraulic unit 30, the front frame section being swingable about the pivot 3 and relative to the rear frame portion. In addition to this articulated frame type of steering, when the front frame portion is swung relative to the rear frame portion, the steerable front wheels are actuated by the connecting drag link 10, the steering arm 9, and the tie rod 14. As shown in FIG. 3 for example, when the cylinder unit 30 is contracted, the front frame portion F is swung to the right, and at the same time the drag link 10 causes the steering arm 9 to swing, carrying with it the wheel 5 and, through the tie rod 14, the wheel 4.

The trenching means TM is of the conventional type and includes a rearwardly extending boom 40 pivoted to the rear frame portion at 41 and is swingable from a lower position in the trench and an upper position out of the trench for transport. An endless digging chain 44 is trained around the boom and is driven in the conventional manner to dig the trench and convey the spoil to the upper surface of the ground G as the vehicle moves therealong. An auger 46 may also be provided to disperse the loose earth laterally of the trench.

The vehicle also has a front mounted blade 48 which may be used, for example, for back-filling of the trench. The blade is vertically positioned in the conventional manner by a power means such as fluid cylinder and piston means (not shown), and is generally arranged transversely across the front frame portion and may also be adjusted as to its transverse angle with respect to the vehicle. When back-filling, the blade is on the ground and the weight of the vehicle may be imposed thereon, and frequently the front wheels are then lifted off the ground. Under these circumstances, steering ability is often lost with prior art vehicles. With the present articulated vehicle steering arrangement, the ability to continue to steer is not lost.

The combined steering effect of the self-propelled trencher provided by the present invention will now be explained in connection with FIGS. 4 to 6.

Figure 4:
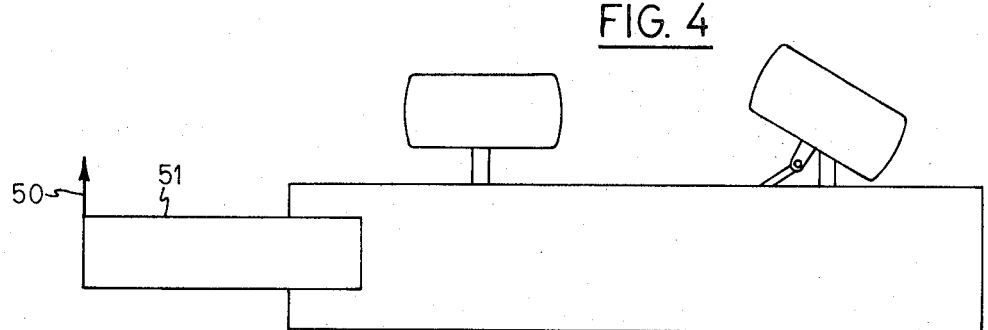
FIG. 4 is a generally schematic view of a conventional rigid frame trencher employing Ackerman type steering.

FIG. 4 illustrates a prior art type of trencher embodying a rigid frame vehicle with Ackerman type steering only. It will be seen that when the vehicle is to be turned to the right, lateral side trust, indicated by the arrow 50, against the trench outer wall occurs as the turn progresses, due to the swinging action of the trencher boom 51. This side thrust makes it difficult to maneuver the vehicle and severely limits the turning ability when trenching. The amount of turning of the wheels is indicated by the angle $\alpha$.

Figure 5:
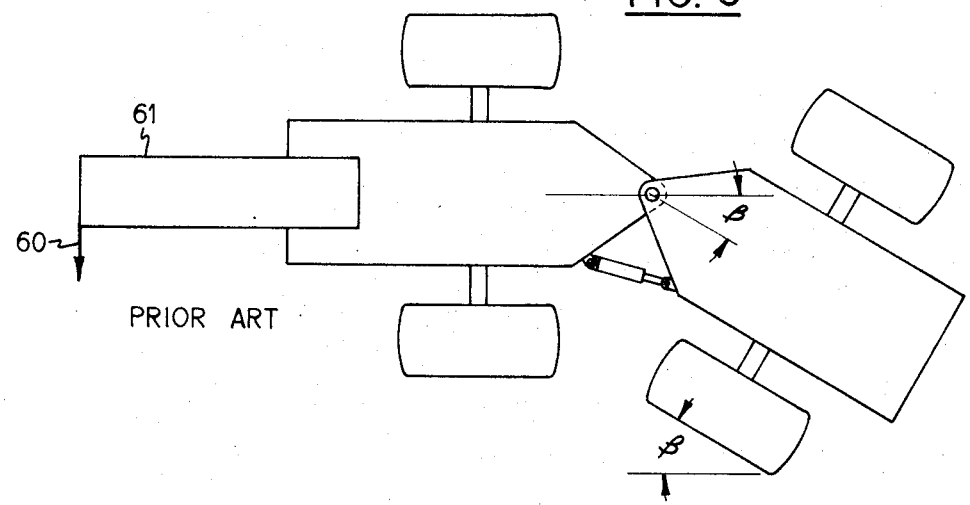
FIG. 5 is a schematic showing of a prior art vehicle which utilizes only articulated frame type steering.

FIG. 5 shows a trencher when utilizing only articulated frame steering and when the vehicle is initially turning to the right, a lateral side thrust as indicated by arrow 60 is imposed against the inner side wall of the trench by the boom 61. The amount of turning of the wheels is indicated by the angle $\beta$.

Figure 6:
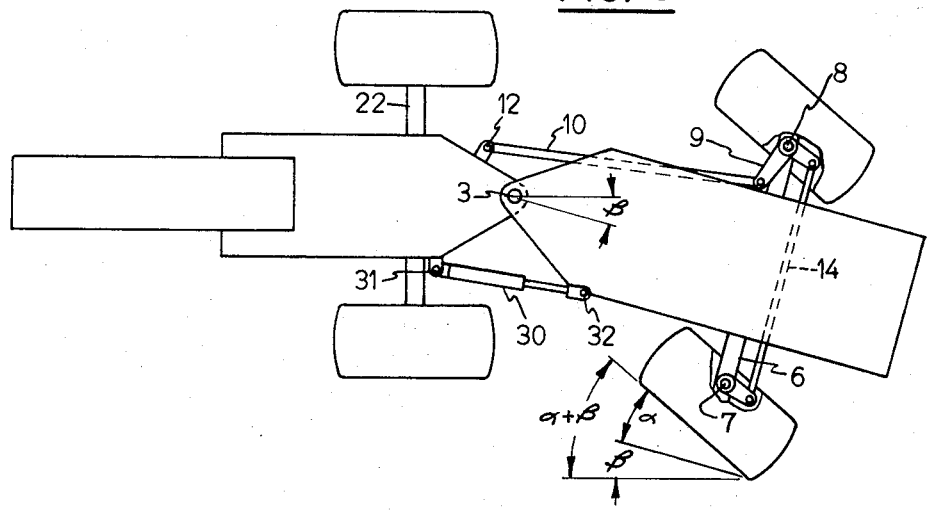
FIG. 6 is a schematic plan view of a self-propelled trencher made in accordance with the present invention and employing combined articulated steering with Ackerman type steering.

A schematic representation of the invention employing combined steering of the trencher is shown in FIG. 6. Initially the trenching mechanism is not crowded as severely against the inside of the curve. The increased amount of turning of the wheels due to the combined steering is indicated by the angles $\alpha$ plus $\beta$. At the time the position of the front wheels relative to the front frame portion is such that they are widely spaced and and forwardly of the frame, thus providing good vehicle stability.

The trencher provided by the present invention also locates the vertical pivot point 3 between the front and rear frame portions at a distance approximately one-third of the wheel base length forwardly of the center of the rear frame portion wheels. Furthermore, the connection at point 12 between the drag link and rear frame is located more closely adjacent the pivot point 3 than it is to the rear axle, as viewed in plan. This construction provides good tracking ability, that is to say, it permits the rear wheels to track readily with the front wheels, and this is important particularly when used with a four-wheel drive vehicle because tire scuffing, wheel spinning, or "wind up" is reduced. Furthermore, this arrangement permits the use of a transmission without the necessity of having an inter-axle differential, resulting in better traction.

In addition, the rearwardly located pivot permits more room to mount the transmission generally amidships, and the transmission and the transmission driving means can both be mounted on the same end of the vehicle along with the engine and hydraulic pump, thereby minimizing the number of parts required and particularly plumbing between the engine and pump. Furthermore and importantly, the operator can be located directly over the vertical pivot 3 and thereby less lateral movement of the operator occurs than with a contilevered location of the operator with respect to the pivot point. This particular location of the vertical pivot point also insures that the engine can be moved further to the rear, thereby reducing engine over-hang and which thereby permits the mounting of the back-fill blade closer to the front wheels and consequently minimizing turning moment due to side draft effect on the front mounted blade.

The combined steering effect provided by the present invention in such a trencher insures good stability of the vehicle, no hazard to the operator due to interference with the scissor action of the vehicle frames, less severe universal joint angles in the drive mechanism and more stable and comfortable operator's positions between the axles of such a trencher.

Exceptionally good maneuverability and good steering ability, particularly when back-filling is provided, and good ability of the vehicle to free itself from tight situations or poor ground conditions is assured.

We claim:

1. A self-propelled trencher and back-filler comprising:
    a front frame portion having thereon
        a power operated back-fill blade generally transversely across the front end of said front frame portion,
        a power plant,
        a transmission connected to said power plant,
        a pair of laterally spaced steerable wheels having a front drive axle connected therebetween, and
        a universal joint drive shaft connecting said transmission to said front drive axle;
    a rear frame portion having thereon
        a pair of laterally spaced wheels having a rear drive axle connected therebetween, and
        trenching means extending rearwardly and being shiftable from a lower trench digging position to a raised transport position;
    pivot means connecting said front and rear frame portions together for swinging movement about a generally vertical axis;
    a universal joint drive shaft connecting said transmission to said rear drive axle;
    power means connected between said front and rear frame portions for changing the relative angular positions of said portions about said generally vertical axis to provide articulated frame steering; and
    a connection between said steerable wheels on said front frame portion and said rear frame portion to cause turning of said steerable wheels when said power means is actuated to cause a combined steering effect;
    said pivot means connecting said front and rear frame portions together being located to position said generally vertical axis a substantial distance rearwardly of the midpoint of the wheel base length to permit said wheels on said rear frame portion to substantially track said wheels on said front frame portion during turns induced by said combined steering effect.

2. A self-propelled trencher and back-filler according to claim 1 wherein a tie rod is connected between said steerable wheels, and wherein said connection between said steerable wheels and said rear frame portion includes a drag link operatively connected at one end to one of said steerable wheels and being pivoted at its opposite end to said rear frame portion at a point more closely adjacent to said vertical axis than to the center of said rear wheels in a longitudinal direction.

3. A self-propelled trencher and back-filler according to claim 1 additionally including an operator's seat located directly above said pivot means.

* * * * *